United States Patent
Ikeya

(10) Patent No.: US 6,707,786 B2
(45) Date of Patent: Mar. 16, 2004

(54) OPTICAL RECORDING MEDIUM HAVING GROOVE WALL AT SPECIFIC ANGLE

(75) Inventor: Tomonori Ikeya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 09/961,135

(22) Filed: Sep. 21, 2001

(65) Prior Publication Data

US 2002/0027870 A1 Mar. 7, 2002

Related U.S. Application Data

(63) Continuation of application No. PCT/JP99/02613, filed on May 19, 1999.

(51) Int. Cl.⁷ ............................................. G11B 7/24
(52) U.S. Cl. ........................... 369/275.4; 428/64.4
(58) Field of Search .................... 369/275.4, 275.2, 369/278, 279, 277; 428/64.1, 64.3, 64.4; 430/320, 321

(56) References Cited

U.S. PATENT DOCUMENTS

| | | | | |
|---|---|---|---|---|
| 4,931,336 A | * | 6/1990 | Haneda | |
| 5,430,706 A | * | 7/1995 | Utsunomiya et al. | 369/275.1 |
| 6,154,440 A | * | 11/2000 | Ichihara | 369/275.4 |
| 6,180,208 B1 | * | 1/2001 | Shiratori et al. | 369/275.4 |
| 6,212,158 B1 | * | 4/2001 | Ha et al. | 369/275.4 |
| 6,287,660 B1 | * | 9/2001 | Hosaka et al. | 369/275.4 |
| 6,343,052 B1 | * | 1/2002 | Hashimoto et al. | 369/13 |
| 6,480,462 B2 | * | 11/2002 | Ha et al. | 369/275.4 |
| 6,512,735 B1 | * | 1/2003 | Takeda et al. | 369/275.4 |

FOREIGN PATENT DOCUMENTS

| | | |
|---|---|---|
| JP | 06-290496 | 10/1994 |
| JP | 07-244877 | 9/1995 |
| JP | 10-275369 | 10/1998 |
| JP | 11-149667 | 6/1999 |

\* cited by examiner

Primary Examiner—Tan Dinh
(74) Attorney, Agent, or Firm—Greer, Burns & Crain, Ltd.

(57) ABSTRACT

The present invention relates to a process for producing an information recording medium including the steps of forming, on a substrate provided with a groove having a wall which forms an angle smaller than 80° with respect to a bottom of the groove, an underlayer having a wall which forms an angle of 80° or more with respect to the bottom of the groove, by a film forming method of a low directivity; and forming at least a recording film on the formed underlayer at the bottom of the groove, on the top of a projected portion between grooves or both at the bottom of the groove and on the top of the projected portion, and an information recording medium obtained thereby.

12 Claims, 8 Drawing Sheets

OPTICAL RECORDING MEDIUM HAVING GROOVE WALL AT SPECIFIC ANGLE

CROSS-REFERENCE TO RELATED APPLICATION

This application is a continuation of No.PCT/JP99/02613 filed on May 19, 1999 on the basis of which priority is claimed under 35 USC §120, the disclosure of said application being incorporated by reference in its entirety.

BACKGROUND OF THE INVENTION

1. Field of the Invention

The present invention relates to an information recording medium and a production process therefor.

2. Description of Related Art

Various kinds of optical recording media and magnetic recording media are known as information recording media having recording films capable of recording and storing information. Among such recording media, magneto-optical disks, phase change optical disks, floptical disks, hard disks and the like are known as rewritable information recording media. Information is recorded on these information recording media by forming a magnetic domain in their recording films by magnetic means including thermo-magnetic recording means or by forming a part where atomic or molecular orientation of the recording films is changed by thermal means. The recorded information is reproduced by detecting a turn of a plane of polarization by the magnetic domain, a change in reflectance or the like.

In the information recording media, recording and reproduction are carried out at a predetermined position by means of tracking.

For example, in the case of magneto-optic disks, guide grooves (referred to simply as grooves hereinafter) are formed on the disks. In magneto-optic disks currently available in the market, information is recorded in a recording film on the top of a projected portion (a land) between grooves. However, for higher recording density, it has been proposed to record and reproduce information both on lands and in grooves (a land/groove recording method).

In this method, since both the lands and the grooves are recording tracks, the spacing between the tracks is smaller. That may cause cross-writing and cross-erasing. The cross-writing means that information is also recorded on a track adjacent to a track on which the information is intended to be recorded, and the cross-erasing means that information is erased from a track adjacent to a track from which information is intended to be erased.

In order to prevent the cross-writing and cross-erasing, it has been proposed to enlarge the distance between the bottom of the grooves and the top of the lands, that is, to deepen the depth of the grooves. However, if the grooves are deepened, the recording film adheres to the bottom of the grooves in a smaller amount, and therefore, it is difficult to obtain a recording film with desired characteristics.

Japanese Unexamined Patent Publication No. HEI 10 (1998)-275369 reports a solution to the above-described problem. According to this publication, the grooves have a wall angle within the range of 70 to 90° with respect to the bottom of the grooves, and the recording film is formed by a method of high directivity. It is reported that thereby the recording film on the top of the lands can be thermally and magnetically separated from the recording film at the bottom of the grooves.

Here, as shown in FIG. 1, the wall angle means an angle α defined by a bottom face g of a groove and a tangent line f to the wall at half the maximum height d of the groove (a level difference between the top of the land A and the bottom of the groove B) in a sectional view orthogonal to the direction of a recording track.

The mass-production of substrates is achieved by the following process. First, a metal transfer mold (what is called a stamper) is produced from an original disk on which grooves and pits are formed. An ultraviolet curing resin or a molten resin is cast onto the stamper and cured. The cured resin is peeled off the stamper to give a substrate.

However, a problem is that it is difficult to take the stamper off the original disk if the wall angle is large. This problem is significant when the wall angle is 80° or larger and is further serious when the grooves are deep.

Furthermore, from the viewpoint of magnetic and thermal separation of adjacent tracks, the wall angle is preferably 90° or greater, that is, the walls of the grooves are preferably in a so-called overhanging state. However, the production of such substrates involves the stamper engaging with the original disk and the substrate of cured resin engaging with the stamper in the form of dovetail joints. Therefore, it is physically impossible at the level of today's technology to disengage them from each other.

Besides the above mentioned, it is known to form the grooves directly by writing means such as a laser. However, it is difficult to form grooves with a wall angle of 80° or more by such means.

SUMMARY OF THE INVENTION

The present invention provides a process for producing an information recording medium comprising the steps of:

forming, on a substrate provided with a groove having a wall which forms an angle smaller than 80° with respect to a bottom of the groove, an underlayer having a wall which forms an angle of 80° or more with respect to the bottom of the groove, by a film forming method of a low directivity; and forming at least a recording film on the formed underlayer at the bottom of the groove, on the top of a projected portion between grooves or both at the bottom of the groove and on the top of the projected portion.

The present invention also provides an information recording medium comprising:

a substrate with a groove formed thereon;

an underlayer formed on the substrate to cover at least a wall of the groove; and a recording film formed at least at a bottom of the groove, on the top of a projected portion between grooves or both at the bottom of the groove and on the top of the projected portion, wherein the wall of the groove has an angle smaller than 80° with respect to the bottom of the groove and the wall of the underlayer has an angle of 80° or more with respect to the bottom of the groove.

The present invention further provides an information recording medium comprising a substrate having a groove, an underlayer which has been formed on the substrate with rotating the substrate, and a recording film which has been formed on the underlayer with maintaining the substrate in a stationary state.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
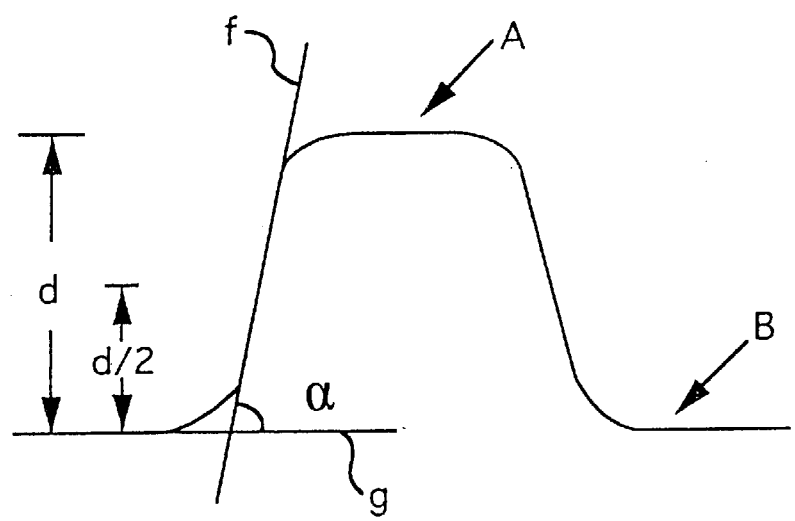
FIG. 1 illustrates the definition of a wall angle in the present specification.

As substrates usable in the present invention, may be mentioned a substrate of a resin such as polycarbonate, a glass substrate, a glass substrate with a resin derived from a photopolymer formed thereon and the like. Grooves are formed on the substrate. The grooves may be formed by transfer from an original disk through a stamper, which is suitable for mass-production. In addition to this transfer process, the grooves may be formed directly on the substrate using a writing means such as a laser. Further, the grooves may be formed by applying a photopolymer onto the substrate, exposing the photopolymer to light and washing the resulting substrate. The grooves may also be formed by etching the substrate by means of a reactive ion etching (RIE) process.

One feature of the present invention is that the walls of the grooves have an angle smaller than 80° with respect to the bottom of the grooves (the angle is referred to as a wall angle of the substrate hereinafter). By setting the wall angle smaller than 80°, the stamper can be peeled off the original disk more easily and the produced substrate can be peeled off the stamper more easily. A particularly preferable wall angle of the substrate is 30 to 70°.

Since the information recording medium of the present invention may be used for any of a land recording method, a groove recording method and the land/groove recording method, the depth of the grooves, the width of the bottom of the grooves and the width of the top of the lands are preferably set as appropriate depending upon a method selected and upon a recording density (or recording capacity) desired. More particularly, for the land recording method, the depth of the grooves, the width of the bottom of the grooves and the width of the top of the lands are preferably 40 to 200 nm, 0 to 0.3 $\mu$m and 0.4 to 0.9 $\mu$m, respectively. For the groove recording method, the depth of the grooves, the width of the bottom of the grooves and the width of the top of the lands are preferably 40 to 200 nm, 0.3 to 0.8 $\mu$m and 0.2 to 0.4 $\mu$m, respectively. For the land/groove recording method, the depth of the grooves, the width of the bottom of the grooves and the width of the top of the lands are preferably 40 to 200 nm, 0.3 to 0.6 $\mu$m and 0.3 to 0.6 $\mu$m, respectively.

Next, an underlayer is formed on the substrate. The underlayer may be formed of a single layer or a plurality of layers. The underlayer may be used as an underlayer protecting layer, an enhancing layer, a heat-radiating layer, a reflection layer or the like. As materials for the underlayer, may be mentioned Al, Mo, Pt, W, Cr, Ti, SiN, AlN, $SiO_2$, AlO, ZnO and the like. The underlayer is formed to cover at least the walls of the grooves. In the present invention, the underlayer is formed to make walls having an angle of 80° or more with respect to the bottom of the grooves (the angle is referred to as a wall angle of the underlayer hereinafter). Thereby, it has become possible to realize the wall angle, which was not obtained by the prior-art technique. Further the wall angle of the underlayer is preferably 90° or more, that is, in the over hanging state, more preferably 90 to 120°.

Figure 2:
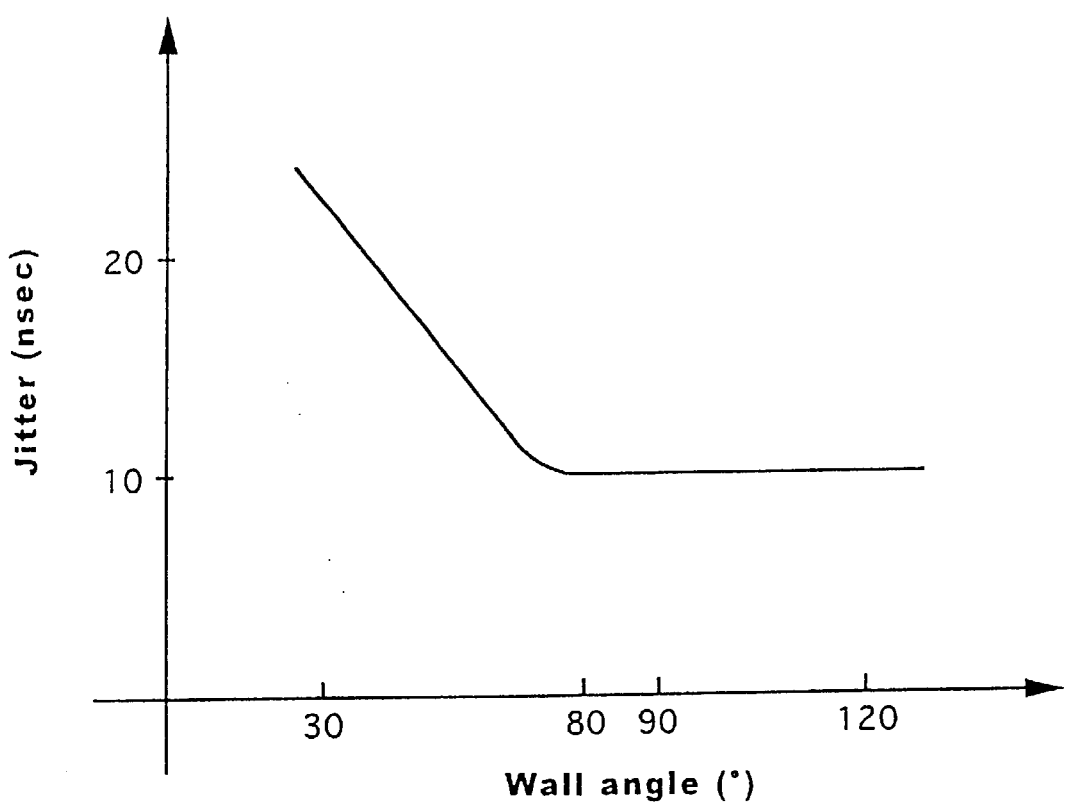
FIG. 2 is a graphical representation showing a relationship between the wall angle and a jitter.

FIG. 2 is a graphical representation showing a relationship between the wall angle and a jitter. As understood from FIG. 2, the inclination of a wall angle—jitter curve decreases as the wall angle exceeds about 80°, and an almost constant jitter is obtained when the wall angle is about 90°. Therefore, the wall angle is preferably 80° or more. This wall angle can be realized by the present invention.

Figure 3:
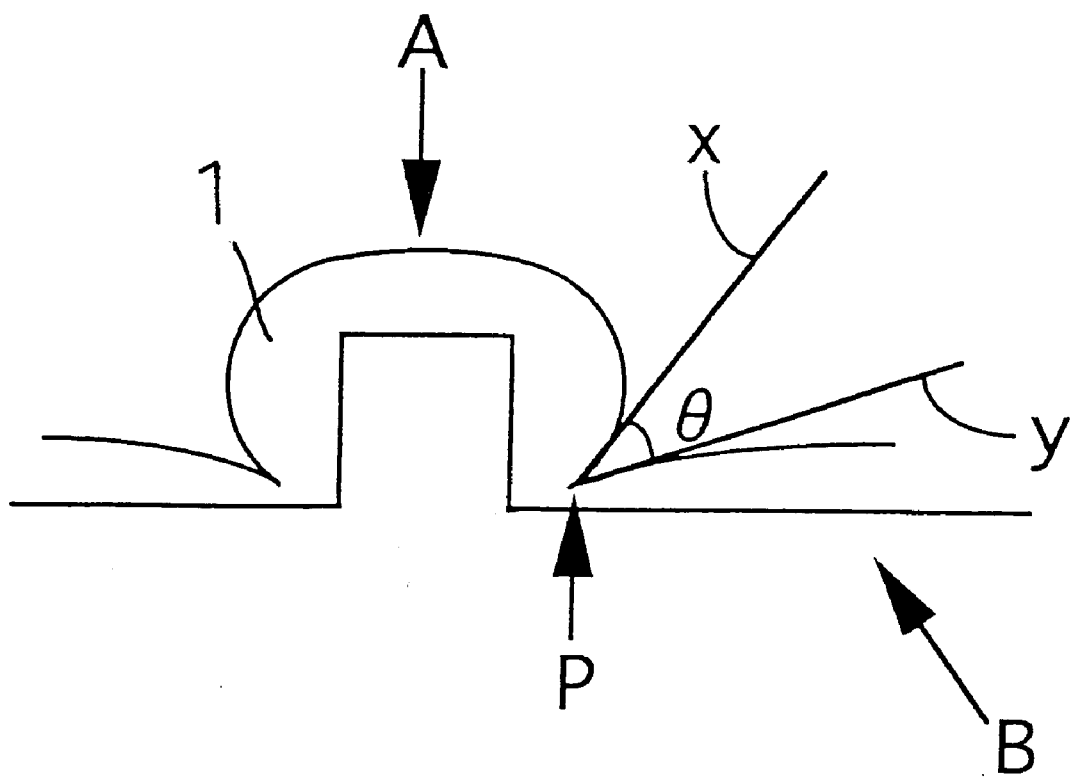
FIG. 3 illustrates the definition of a relative angle of an underlayer in the present specification.

As shown in FIG. 3, the underlayer preferably has a relative angle θ of 90° or less as defined by a tangent line x to the sidewall of the underlayer and a tangent line y to the bottom face of the underlayer at a narrowed portion P near the edge of the land A. By setting the related angle to 90° or less, a structure in which adjacent recording films are separated can be formed easily. The cross writing and the cross erasing in the land/groove recording method, in particular, can be prevented.

Figure 4:
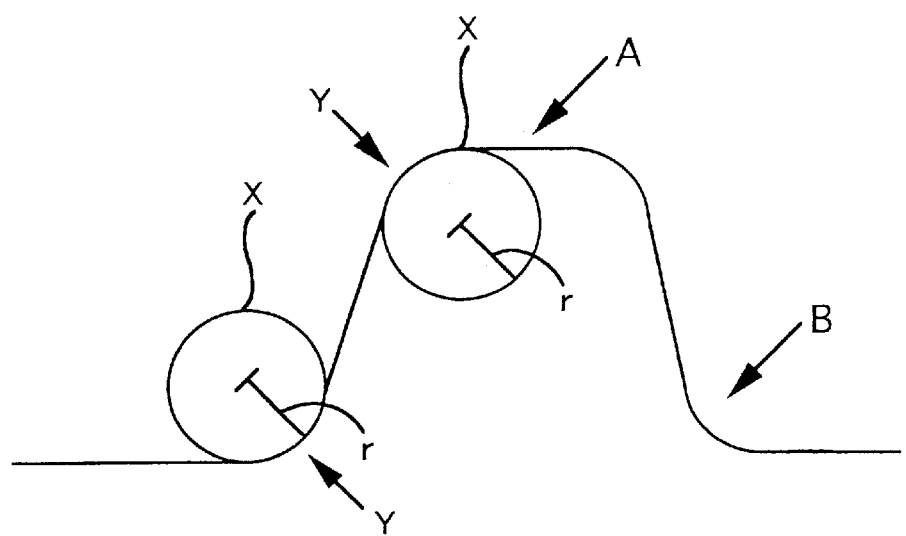
FIG. 4 illustrates the definition of a sharpness of a corner in the present specification.

Further, in the case where the substrate is produced by transfer from the stamper, the underlayer preferably has a sharpness of 5 nm or less at its corners. In the present invention, the sharpness of the corners has a meaning as shown in FIG. 4. That is, in a cross section orthogonal to the direction of a recording track, the sharpness means the roundness of a corner Y of the top of the land A and/or the roundness of a contact Y (referred to as a corner) of the bottom of the groove with the sidewall. The roundness is defined by the radius r of the maximum inscribed circle of the corner Y. The smaller the r is, the better and sharper the sharpness is.

Further, the underlayer may have any thickness so long as the above-mentioned wall angle of the underlayer is realized. Preferably, the thickness is about 30 to 160 nm.

In the present invention, the recording film is provided at the bottom of the grooves, on the top of the projected portions (lands) between the grooves or on both the bottom and the top.

As materials for constituting the recording film, both materials for optical recording media and materials for magnetic recording media can be used.

As materials for optical recording media, may be mentioned alloys of Pb, Te, Se, Ge, Sb, Ag and In, for example. As materials for magnetic recording media, may be mentioned rare earth—iron family alloys of one or a plurality of rare earth metal elements such as Pr, Nd, Sm, Gd, Tb, Dy, Ho and the like with one or a plurality of iron family elements such as Fe, Co, Ni and the like. A small amount of element(s) such as Cr, Mn, Cu, Ti, Al, Si, Pt, In and the like may added to the alloy. The mixture ratios of these elements are set as appropriate depending upon required performances (e.g., saturation magnetization, coercive force, etc.) of the magneto-optic recording medium. More particularly, may be mentioned TbFe, TbFeCr, TbFeCo, DyFeCo, GdCo, GdFe, TbCo, GdTbFe, GdTbFeCo, GdDyFeCo and the like. These magnetic recording media can be used as magneto-optical recording media. As other magnetic recording media, may be mentioned Co—Cr—Ta alloys, Co—Cr—Pt alloys, $\gamma$—$Fe_2O_3$:Co, $BaFeCoTiO_{12}$ and the like.

The construction of the recording film is not particularly limited, and any construction known in the field can be used. For example, the recording film may be one recording/reproducing layer capable of both recording and reproduction, a laminate of a recording/reproducing layer and a magnetization inversion assisting layer, a laminate of a recording layer and a reproducing layer, and the like. The provision of the magnetization inversion assisting layer stabilizes a recording mark more. Further, an intermediate layer may be provided between the recording layer and the reproducing layer for controlling recording and reproduction. Further, a reproduction assisting layer may be provided on the reproducing layer. An axis of easy magnetization of each layer may be in a vertical direction or in an inplanar direction. The layers may be exchange-coupled.

Japanese Unexamined Patent Publication No. HEI 7(1995)-244877 discloses several examples of laminate structures of the recording layer, the intermediate layer and the reproducing layer. The present invention is applicable to these structures. More particularly, according to this publication, providing that the curie temperatures of the recording layer, the intermediate layer and the reproducing layer are represented by Tc3, Tc2 and Tc1, respectively, the layers have relationships of Tc3>Tc1 and Tc2>Tc1. Further, the axes of easy magnetization of the recording layer, the intermediate layer and the reproducing layer are selected from a combination of vertical, vertical and inplanar axes, a combination of vertical, inplanar and inplanar axes and a combination of vertical, inplanar and vertical axes.

In the case where the recording film is formed of one recording/reproducing layer capable of both recording and reproduction, its thickness is preferably 20 to 100 nm. In the case where the recording film is formed of a laminate of the recording/reproducing layer and the magnetization inversion assisting layer, the recording/reproducing layer is preferably 20 to 70 nm thick and the magnetization inversion assisting layer is preferably 1 to 10 nm thick. In the case where the recording film is formed of a laminate of the recording layer and the reproducing layer, the recording layer is preferably 15 to 100 nm thick and the reproducing layer is preferably 5 to 50 nm thick. In the case where the recording film is formed of a laminate of the recording layer, the intermediate layer and the reproducing layer, the recording layer is preferably 30 to 100 nm thick, the intermediate layer is preferably 2 to 20 nm thick and the reproducing layer is preferably 20 to 50 nm thick. In the case where the reproduction assisting layer is provided, its thickness is preferably 5 to 30 nm.

A protecting layer may be formed on the surface of the recording film. Since the recording film usually contains elements easy to be oxidized, the recording film is oxidized if it is exposed to air or if an overcoating film or a lubricant film to be formed later has a portion to expose the recording film, and therefore, characteristics of the recording film deteriorate. For this reason, the protecting layer can prevent the deterioration of the recording film by being formed not to expose the recording film, especially to cover sidewalls of the recording film.

The protecting layer may be formed of a single layer or a plurality of layers. The protecting layer may be used as a surface protecting layer, an enhancing layer, a heat-radiating layer, a reflection layer or the like. As materials for the protecting layer, may be mentioned Al, Mo, Pt, W, Cr, Ti, SiN, AlN, $SiO_2$, AlO, ZnO and the like.

If the protecting layer does not function as a heat-radiating layer, a heat-radiating layer is preferably formed on the protecting layer. Preferably, the heat-radiating layer is formed only on the recording film with intervention of the protecting layer. The protecting layer thus formed can thermally separate adjacent tracks, guide grooves or sidewalls of grooves, and therefore, cross writing and cross erasing can be prevented more effectively.

Figure 5:
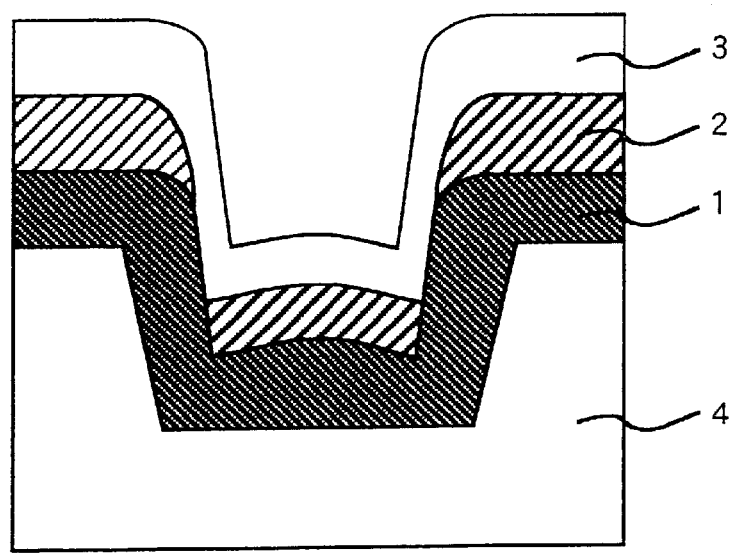
FIG. 5 is a schematic sectional view of an information recording medium which illustrates a process for producing the information recording medium in accordance with the present invention.

Now, the process of producing the information recording medium of the present invention is explained with reference to FIG. 5.

First, on a substrate 4 with grooves having sidewalls forming an angle less than 80° with respect to their bottom, an underlayer 1 is formed by a film formation method of low directivity. The underlayer 1 have sidewalls forming an angle of 80° or more with respect to the bottom of the grooves. Here, as film formation methods of low directivity, may be mentioned a sputtering method (e.g., a magnetron sputtering method), a deposition method and the like which are carried out with turning the substrate. By such a film formation method, the underlayer 1 is formed on the entire surface of the substrate 4 including the sidewalls of the grooves with the thickness thereof increasing from the bottom to the top of the sidewalls. Therefore, the wall angle of the underlayer 1 is larger than the wall angle of the substrate. Thus it is possible to realize the wall angle of the underlayer good for magnetically and thermally separating the recording film. Further, good peelability is obtained when the substrate is peeled off the stamper.

In the case where the underlayer 1 is formed of a plurality of layers, it is sufficient that at least one of the layers is formed by a method of low directivity.

Next, a recording film 2 is formed on the underlayer 1 on the bottom of the grooves, on the top of the lands between the grooves or on both the bottom and the top. Preferably, the recording film is formed by a film formation method of high directivity. As film formation methods of high directivity, a sputtering method (e.g., a helicon sputtering method, an ion beam sputtering method), a deposition method and the like which are carried out with maintaining the substrate in the stationary state. If the recording film is formed by the method of high directivity, the recording film is formed by priority on the bottom of the grooves and on the top of the lands since the walls of the underlayer 1 have an angle of 80° or more. Thus, the recording film 2 can be magnetically and thermally separated.

A protecting layer 3 may be formed at least on the surface of the recording film 2. The protecting layer may be formed by a film formation method either of high directivity or of low directivity, but a method of low directivity is preferable.

By being formed by this method, the protecting layer 3 can be formed not to expose the recording film 2. As such film formation methods, may be mentioned a sputtering method (e.g., a magnetron sputtering method), a deposition method and the like which are carried out with turning the substrate. In the case of a method of high directivity, the protecting layer is preferably formed thicker so that the sidewalls of the recording film on the top of the lands are not exposed.

Further, a heat-radiating layer may be formed on the protecting layer. The heat-radiating layer may be formed by any known method without any particular limitation. The heat-radiating layer is preferably formed only on the recording film with intervention of the protecting layer. As a method for forming the heat-radiating film in this manner, may be mentioned a method of high directivity, i.e., a sputtering method (e.g., a helicon sputtering method, an ion beam sputtering), a deposition method and the like which are carried out with maintaining the substrate in the stationary state.

If the above-described layers of the information recording medium are required to be formed in different film-forming apparatuses, oxides formed on the surface and/or areas having adsorbed gases of a strong oxidizing property may be etched after the information recording medium in process is moved through an apparatus.

Further, the present invention provides an information recording medium comprising a substrate having grooves, an underlayer having been formed on the substrate with turning the substrate, and a recording layer having been formed on the underlayer with maintaining the substrate in a stationary state.

Information can be recorded on or reproduced from the information recording medium of the present invention by any known recording and reproducing apparatus without any particular limitation.

A recording and reproducing apparatus used for an optical recording medium may have the following construction, for example. A light-irradiating means such as a laser is provided for irradiating a site desired to record information with light. The information is recorded by changing crystallinity of the recording film at the site. A light-irradiating means such as a laser is provided for irradiating a site from which information is to be reproduced, with light which does not change the crystallinity of the recording film at the site, in order to reproduce the information. The light irradiating means may comprise a laser and a means for collecting light from the laser (e.g., a lens), for example.

A recording and reproducing apparatus used for a magnetic recording medium may have the following construction, for example. The recording and reproducing apparatus has a slider provided at least with a magnetic head. The magnetic head is for recording and/or reproducing information on and/or from the recording medium. As the magnetic head, a recording head and a reproducing head may be provided separately.

A recording and reproducing apparatus used for a magneto-optical recording medium has a slider provided with a magnetic head and a light-irradiating means (e.g., a laser), for example. The light-irradiating means irradiates the recording medium with light and thereby raises the temperature of a site irradiated with light to facilitate the recording and reproduction of information and also reduces the size of a recording mark further.

Figure 6:
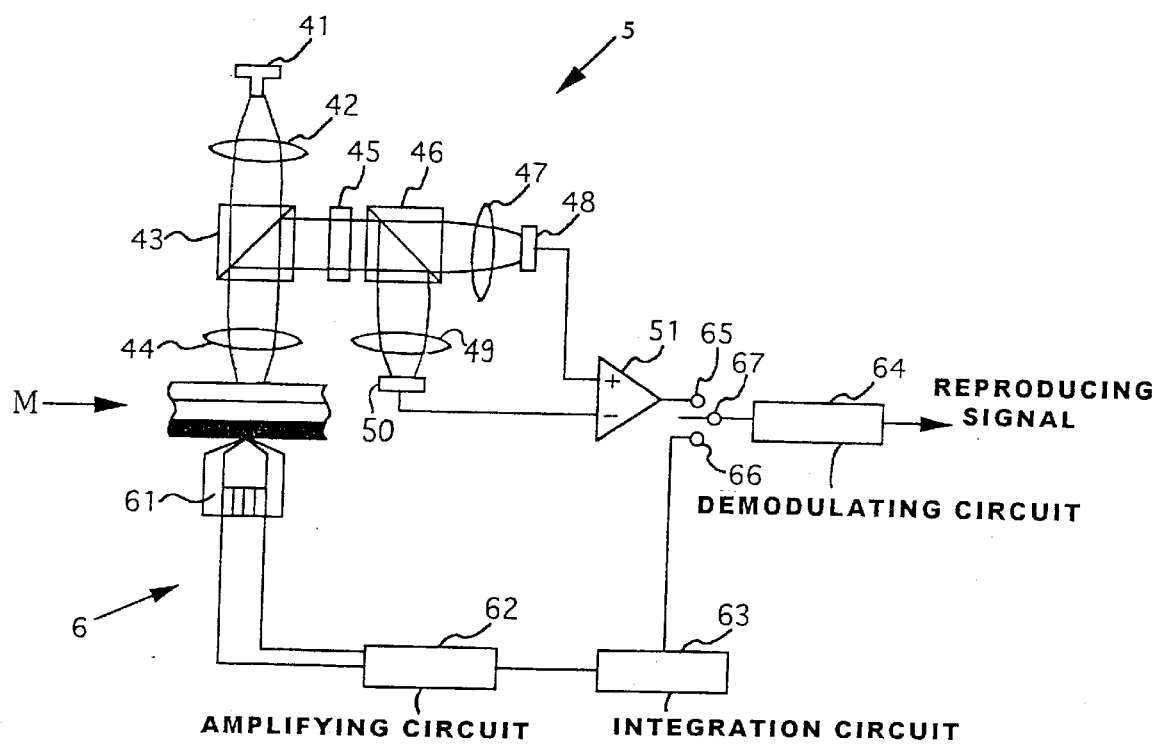
FIG. 6 is a schematic view illustrating the construction of an apparatus for recording information on and reproducing information from a magneto-optical recording medium in accordance with the present invention.

FIG. 6 shows the construction of an apparatus for recording information on and reproducing information from the magneto-optical recording medium. There are shown in the figure an information recording medium M, a light-emitting means 5 and a magnetic head 6 provided in a slider.

In the light-emitting means 5, if the light is laser light, a laser 41, a collimator lens 42 for collimating the laser light, a splitter 43 for transmitting or reflecting the laser light and an objective lens 44 are arranged in order toward the information recording medium M. Further, a ½ wavelength plate 45 for rotating the plane of polarization of the laser light, a polarized beam splitter 46 for separating the laser light into a vertical component and a horizontal component are arranged in this order on a reflection side of the splitter 43. On an output side of the splitter 43, there are provided light-collecting lenses 47 and 49 for collecting output light of the horizontal component and of the vertical component, respectively. On an output side of the light-collecting lenses 47 and 49, light detectors 48 and 50 are arranged, respectively. An amplifier 51 is connected to the light detectors 48 and 50 for obtaining a deference between signals detected by the detectors and amplifying the deference. A signal from the amplifier 51 is output to a switching terminal 65 of a switch section.

The magnetic head 6 is provided with an amplifying circuit 62 for receiving and amplifying an electric signal which is detected by a slider 61 provided with the magnetic head and corresponds to the direction of magnetization and an integration circuit 63 for receiving the amplified signal and shaping its waveform. The signal output from the integration circuit 63 is output to a switching terminal 66. Either of the signals output to the switching terminals 65 and 66 is input to a demodulating circuit 64 by switching a common terminal 67 of the switch section, and is demodulated and output as a signal.

In the recording and reproducing apparatus of FIG. 6, the light-emitting means 5 is provided oppositely to the magnetic head 6. However, the light-emitting means 5 and the magnetic head 6 may be mounted on the same side with respect to the information recording medium M. That is, it is also possible to adopt a so-called front illumination system in which information is recorded or reproduced by emitting light from a recording film side opposite to the interface with the substrate.

Figure 7A:
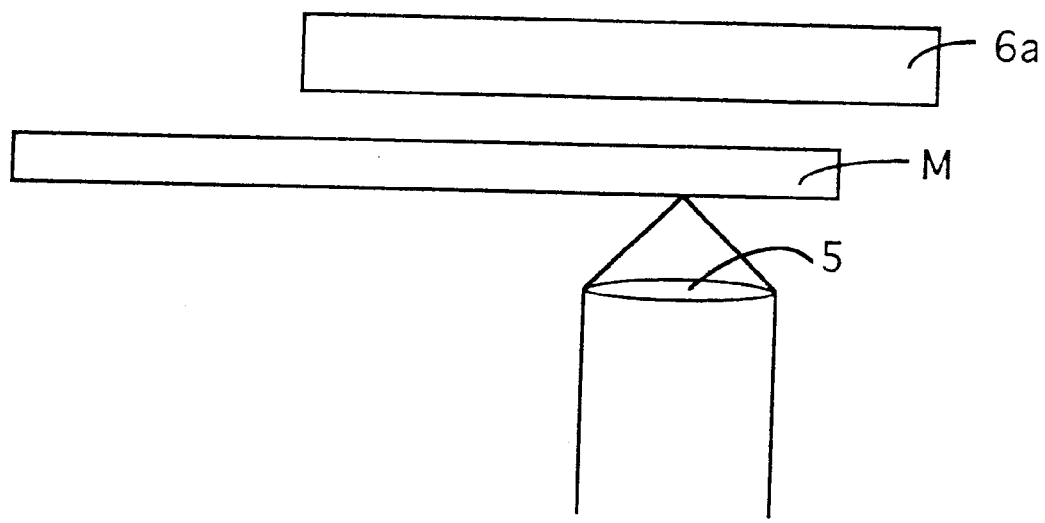
FIGS. 7(a) and 7(b) are schematic views illustrating the construction of an apparatus for recording information on and reproducing information from a magneto-optical recording medium in accordance with the present invention.
Figure 7B:
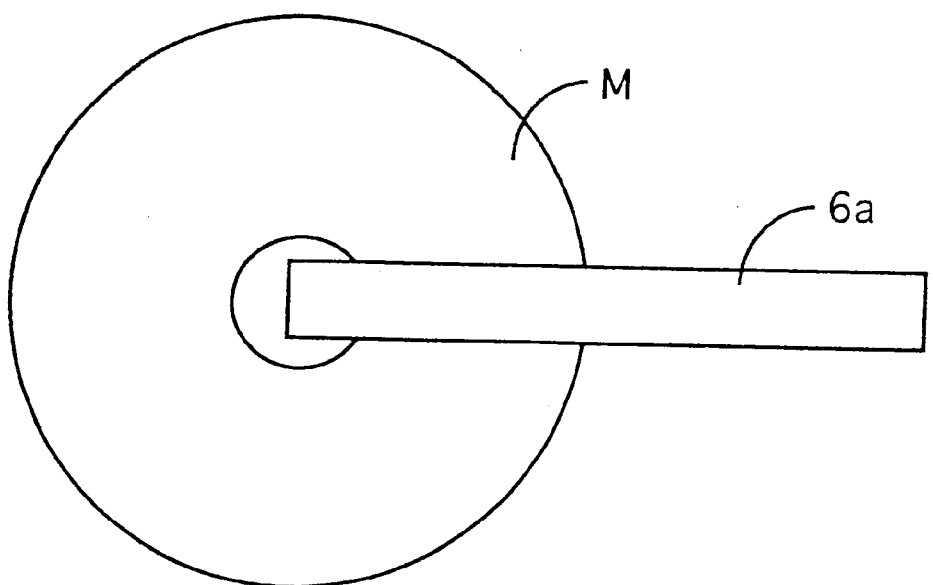

The recording and reproducing apparatus of FIG. 7 employs a magnetic field modulation system. The present invention is also applicable to an apparatus employing a light modulation system. FIG. 7(a) shows a schematic sectional view of the apparatus employing a light modulation system and FIG. 7(b) shows a plan view thereof. In the figures, 6a denotes a bias magnetic field $H_B$ applying means (e.g., an electromagnet, permanent magnet, etc.) In the light modulation system, unlike the magnetic field modulation system, the bias magnetic field $H_B$ applying means 6a is enlarged to cover all tracks.

A basic erasing and writing process is explained with the light modulation system. Data is erased by applying a bias magnetic field in an N direction or an S direction and irradiating all the tracks with light by the light-emitting means 5 (e.g., DC light, pulse laser light, etc.). On the other hand, data is written by applying a bias magnetic field in an opposite direction to the direction for erasing data and irradiating only a site where data is to be written with light.

EXAMPLE 1

Figure 8A:
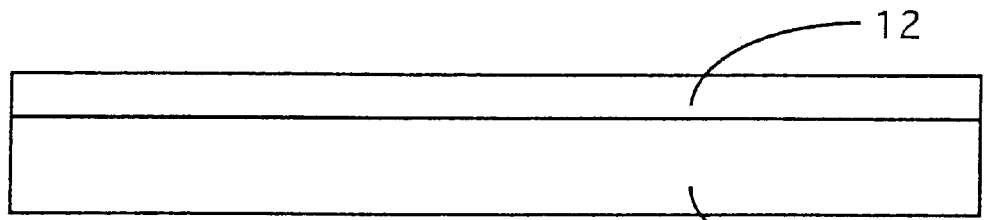
FIGS. 8(a) to 8(d) are schematic views illustrating a process for producing a substrate in accordance with Example 1 of the present invention.
Figure 8B:
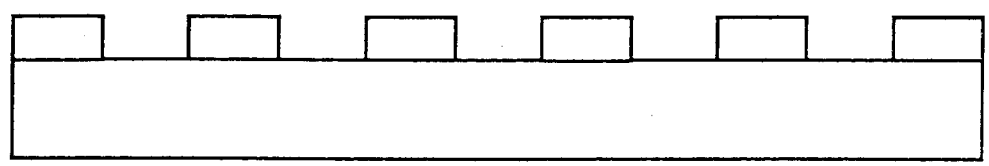
Figure 8C:
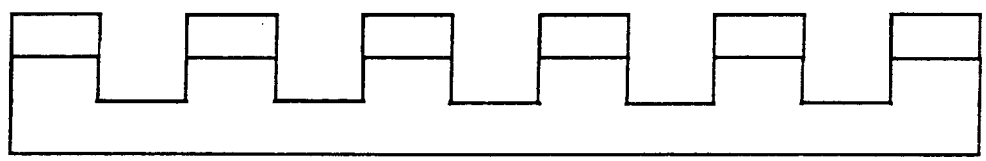
Figure 8D:
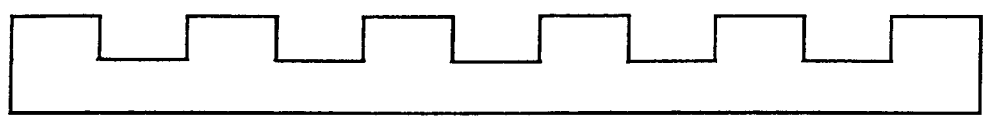

A disk-form glass substrate was prepared which had grooves whose pitch was 1.2 μm, depth was 60 nm and wall angle was about 60°. In this substrate, the top faces of the lands and the bottom faces of the grooves had the same width. The grooves of the glass substrate were formed by the steps of FIGS. 8(a) to 8(d). More particularly, a photoresist 12 was applied to a substrate 11 (see FIG. 8(a)). The photoresist 12 was patterned into a desired configuration through exposure and development (see FIG. 8(b)). The substrate was etched by a RIE method using the patterned photoresist 12 as a mask (see FIG. 8(c)). Further, the photoresist was removed by ashing, and thereby, the substrate was formed in a desired configuration (FIG. 8(d)).

An underlayer was formed of silicon nitride to a thickness of 90 nm on the substrate by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm. The wall angle of the underlayer was about 90° and the relative angle θ of the underlayer was 80°.

On the underlayer, a recording film was formed of a reproducing layer of 30 nm, an intermediate layer of 10 nm and a recording layer of 80 nm in this order. The recording film was formed by opposing a target and the substrate in the stationary state, placing an adjusting plate with a slit between the target and the substrate to provide directivity to scattering of particles for forming the recording film and setting a gas pressure of 0.1 Pa and an applied electric power of 0.5 kW. The formed reproducing layer contained, as a main ingredient, GdFe having a curie temperature of about 210° C., the intermediate layer contained, as a main ingredient, TbFe having a curie temperature of about 130° C., and the recording layer contained, as a main ingredient, TbFeCo having a curie temperature of about 300° C.

Subsequently, a protecting layer is formed of silicon nitride to a thickness of 60 nm at least on the recording film. The protecting layer was formed by opposing a target and the substrate in the stationary state, placing an adjusting plate with a slit between the target and the substrate to provide directivity to scattering of particles for forming the protecting layer and setting a gas pressure of 0.6 Pa and an applied electric power of 0.8 kW.

The formation of the above-mentioned underlayer, the recording film and the protecting layer was conducted in the same vacuum apparatus.

Thereafter, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

Figure 9:
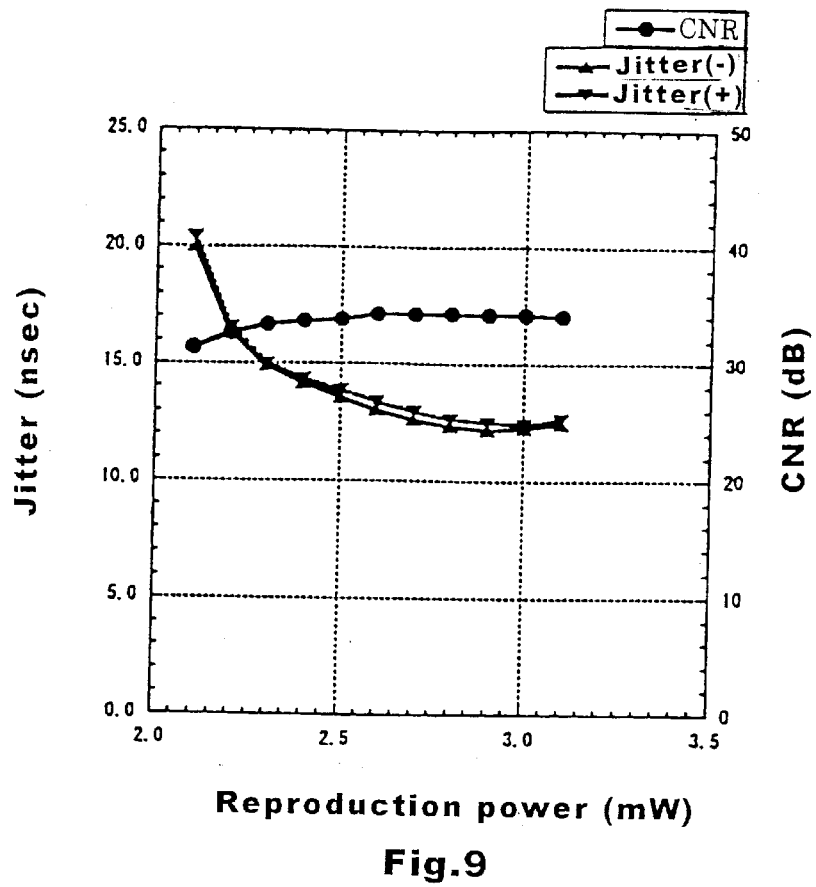
FIG. 9 is a graphical representation showing a relationship of a jitter and a CNR to a reproduction power in the recording media of Example 1 of the present invention and Comparative Example 1.

The obtained information recording medium was evaluated using a tester with an optical system of 640 nm wavelength and 0.55 NA. The following were evaluation conditions: Data was recorded by the magnetic field modulation system at a circumferential velocity of 1 m/sec, a DC recording power of −3.5 mW, an AC magnetic field of ±2500 e and a length of a recording mark of 0.2 μm. The data was reproduced at a circumferential velocity of 1.5 m/sec with varying the reproducing power while the jitter and CNR were measured. The above-mentioned evaluation was carried out on the recording film at the bottom of the grooves. FIG. 9 shows a relationship of the jitter and CNR to the reproduction power.

FIG. 9 shows that the CNR hardly varied and the jitter was within an acceptable range even though the reproducing power was varied.

Comparative Example 1

The same substrate as prepared in Example 1 was prepared. An underlayer of silicon nitride, a recording film constituted of a reproducing layer, an intermediate layer and a recording layer, and a protecting layer of silicon nitride were formed on the substrate in this order. The formation of these layers was conducted by opposing a target and the substrate in the stationary state, placing an adjusting plate with a slit between the target and the substrate to provide directivity to scattering of particles for forming these layers. The thicknesses of the layers were the same as those in Example 1. The underlayer had a wall angle of about 60°. After the layers were formed, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

Data was recorded on and reproduced from the obtained recording medium under the same conditions as described in Example 1. The jitter was over 20 nsec at the smallest and good reproduction was not obtained. Then, lands situated on both sides of recording tracks were annealed at a circumferential velocity of 2 m/sec with varying a laser power (annealing power). The jitter was measured with this information recording medium in the same manner as in Example 1 except that the reproducing power was set to 2.9 mW. The results are shown in FIG. 10.

Figure 10:
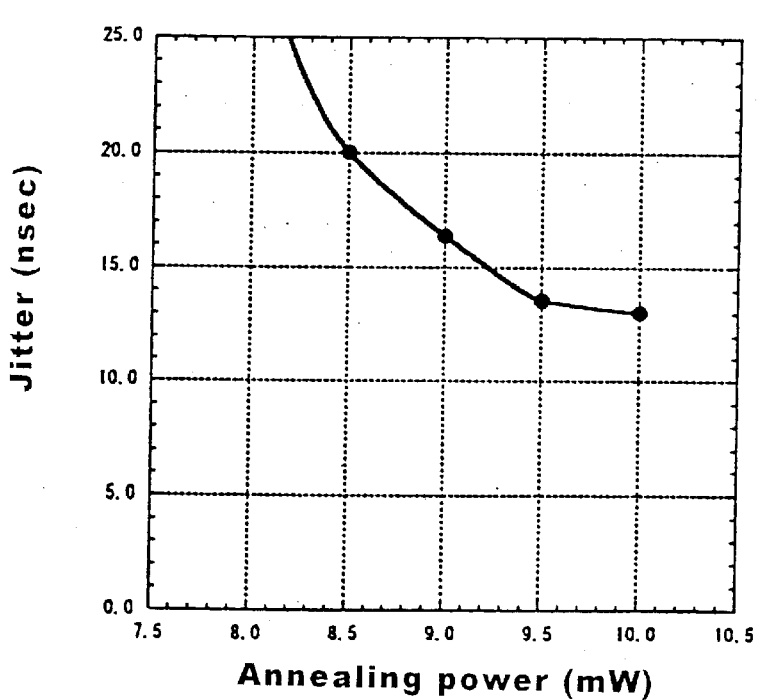
FIG. 10 is a graphical representation showing a relationship of a jitter to an annealing power in the information recording medium of Comparative Example 1.

FIG. 10 shows that the jitter decreased as the annealing power increased. That shows that movement of domain walls in the reproducing layer at the bottom of the grooves was smoothened by annealing the lands on both sides of the recording tracks.

That means that, where the wall angle of the substrate is small, the recording films cannot be separated at both edges thereof unless the wall angle of the underlayer is 80° or larger. In other words, if the underlayer is formed by a method having directivity, the recording film becomes continuous over the entire substrate, so that a desired operation is not provided.

EXAMPLE 2

A disk-form glass substrate was prepared which had grooves whose pitch was 1.2 μm, depth was 160 nm and wall angle was about 60°. In this substrate, the top faces of the lands and the bottom faces of the grooves had the same width. The grooves of the glass substrate were formed in the same manner as described in Example 1.

An underlayer was formed of silicon nitride to a thickness of 90 nm on the substrate by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm. The wall angle of the underlayer was about 90°.

On the underlayer, a recording film was formed of a reproducing layer of 30 nm, an intermediate layer of 10 nm and a recording layer of 80 nm in this order. The recording film was formed by opposing a target and the substrate in the stationary state, placing an adjusting plate with a slit between the target and the substrate to provide directivity to scattering of particles for forming the recording film and setting a gas pressure of 0.1 Pa and an applied electric power of 0.5 kW. The formed reproducing layer contained, as a main ingredient, GdFe having a curie temperature of about 210° C., the intermediate layer contained, as a main ingredient, TbFe having a curie temperature of about 130° C., and the recording layer contained, as a main ingredient, TbFeCo having a curie temperature of about 300° C.

Subsequently, a protecting layer is formed of silicon nitride to a thickness of 60 nm at least on the recording film under the same film forming conditions as used for the underlayer.

The formation of the above-mentioned underlayer, the recording film and the protecting layer was conducted in the same vacuum apparatus.

Thereafter, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

Figure 11:
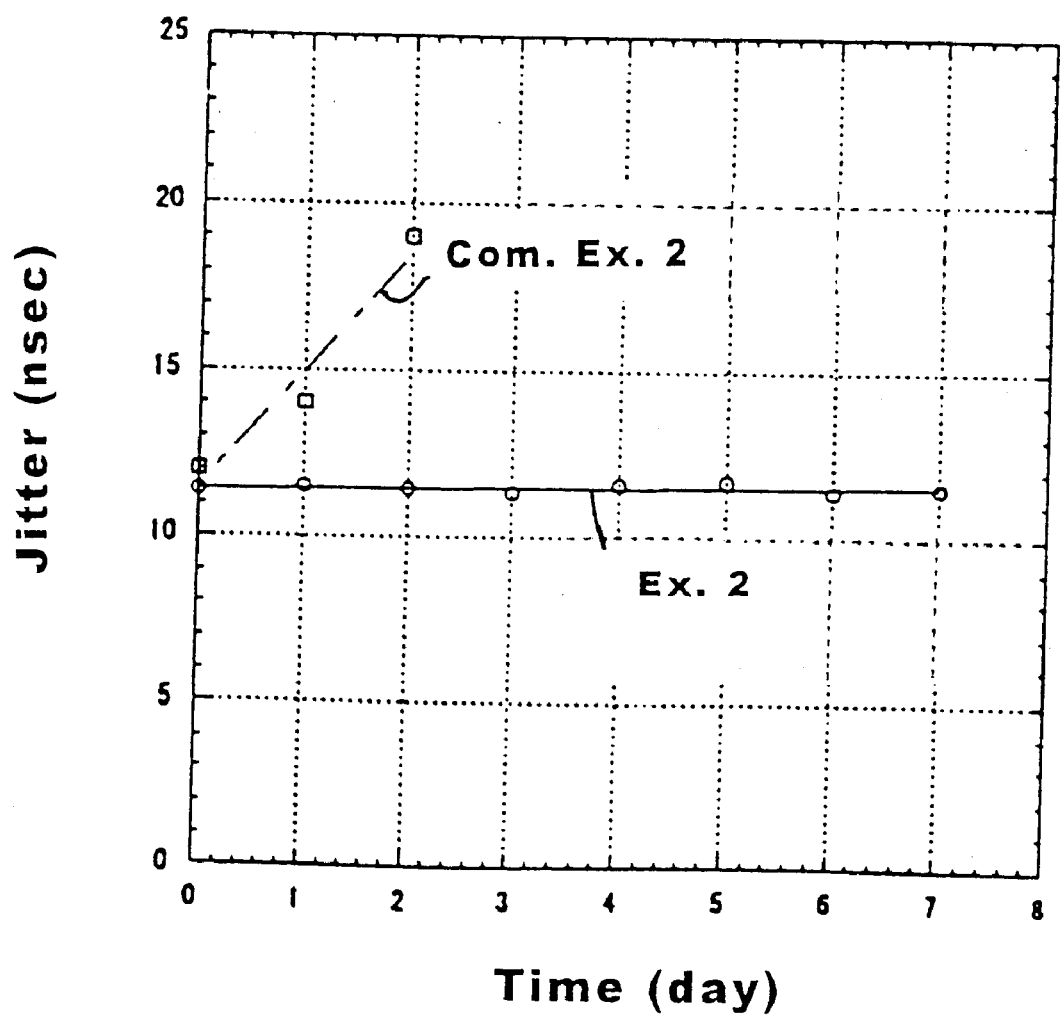
FIG. 11 is a graphical representation showing a change in a jitter of the recording media of Example 2 of the present invention and Comparative Example 2 per elapsed unit time.

The obtained information recording medium was evaluated using a tester with an optical system of 640 nm wavelength and 0.55 NA. The following were evaluation conditions: Data was recorded in the same manner as described in Example 1. The data was reproduced in the same manner as described in Example 1 except that the reproducing power was set to 2.9 mW while the jitter was measured every given period of time. The above-mentioned evaluation was carried out on the recording film on the top of the lands. FIG. 11 shows changes in the jitter with time.

Comparative Example 2

The same substrate as prepared in Example 2 was prepared. An underlayer of silicon nitride, a recording film constituted of a reproducing layer, an intermediate layer and a recording layer, and a protecting layer of silicon nitride were formed on the substrate in this order. The formation of these layers was conducted by opposing a target and the substrate in the stationary state, placing an adjusting plate with a slit between the target and the substrate to provide directivity to scattering of particles for forming these layers. The thicknesses of the layers were the same as those in Example 1. The underlayer had a wall angle of about 62°. After the layers were formed, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The obtained information recording medium was evaluated by measuring changes in the jitter with time under the same conditions as mentioned in Example 2. The results are shown in FIG. 11.

FIG. 11 shows that the jitter in Example 2 was stable even though time elapsed while the jitter in Comparative Example 2 became unable to be measured in a short time. The reason is considered to be that edges of the recording film of the information recording medium of Comparative Example 2 corroded because of contacting the overcoating film.

EXAMPLE 3

A disk-form glass substrate was prepared which had grooves whose pitch was 1.2 $\mu$m, depth was 60 nm and wall angle was about 70°. In this substrate, the top faces of the lands and the bottom faces of the grooves had the same width. The grooves of the glass substrate were formed in the same manner as described in Example 1.

An underlayer was formed of silicon nitride to a thickness of 90 nm on the substrate by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm. The wall angle of the underlayer was observed by SEM to be over 90°, i.e., in the overhang state.

On the underlayer, a recording film was formed of a reproducing layer of 30 nm, an intermediate layer of 10 nm and a recording layer of 80 nm in this order. The recording film was formed by opposing a target and the substrate in the stationary state, placing an adjusting plate with a slit between the target and the substrate to provide directivity to scattering of particles for forming the recording film and setting a gas pressure of 0.1 Pa and an applied electric power of 0.5 kW. The formed reproducing layer contained, as a main ingredient, GdFe having a curie temperature of about 210° C., the intermediate layer contained, as a main ingredient, TbFe having a curie temperature of about 130° C., and the recording layer contained, as a main ingredient, TbFeCo having a curie temperature of about 300° C.

Subsequently, a protecting layer was formed of silicon nitride to a thickness of 60 nm at least on the recording film. The protecting layer was formed by opposing a target and the substrate in the stationary state, placing an adjusting plate with a slit between the target and the substrate to provide directivity to scattering of particles for forming the protecting layer and setting a gas pressure of 0.6 Pa and an applied electric power of 0.8 kW.

The formation of the above-mentioned underlayer, the recording film and the protecting layer was conducted in the same vacuum apparatus.

Thereafter, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The obtained information recording medium was evaluated using a tester with an optical system of 640 nm wavelength and 0.55 NA. The following were evaluation conditions: Data was recorded by the magnetic field modulation system at a circumferential velocity of 1 m/sec, a DC recording power of −3.5 mW, an AC magnetic field of ±2500 e and a length of a recording mark of 0.2 $\mu$m. The data was reproduced at a circumferential velocity of 1.5 m/sec and a reproducing power of 2.9 mW while the jitter was measured. The above-mentioned evaluation was carried out on the recording film at the bottom of the grooves. The results are shown in Table 1.

Comparative Example 3

The same substrate as prepared in Example 3 was prepared. An underlayer of silicon nitride, a recording film constituted of a reproducing layer, an intermediate layer and a recording layer, and a protecting layer of silicon nitride were formed on the substrate in this order. The formation of these layers was conducted by opposing a target and the substrate in the stationary state, placing an adjusting plate with a slit between the target and the substrate to provide directivity to scattering of particles for forming these layers. The thicknesses of the layers were the same as those in Example 1. The underlayer had a wall angle of about 70°. After the layers were formed, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The obtained information recording medium was evaluated by measuring changes in the jitter with time under the same conditions as mentioned in Example 3. The results are shown in Table 1.

TABLE 1

|  | Jitter |
|---|---|
| Example 3 | 9.5 nsec |
| Comparative Example 3 | 11.9 nsec |

Table 1 shows that the information recording medium of Example 3 can reduce the jitter because the wall angle of the underlayer thereof is larger than that of Comparative Example 3.

EXAMPLE 4

A disk-form glass substrate which had grooves whose pitch was 1.2 μm, depth was 60 nm and wall angle was about 80° was prepared of polycarbonate by injection molding using a stamper. In this substrate, the top faces of the lands and the bottom faces of the grooves had the same width. At the injection molding, the transfer was loosened by reducing the pressure of the stamper and lowering the temperature of a mold. After annealing, the wall angle of the substrate was about 70°. The sharpness at corners where the bottom of the grooves contact the sidewalls thereof measured 6 nm in average.

An underlayer was formed of silicon nitride to a thickness of 90 nm on the substrate by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm. The wall was observed by SEM to form an angle over 90°, i.e., an overhang state, locally near a lower part of the underlayer. After the underlayer was formed, the sharpness of the corners of the underlayer was 2 nm or less.

On the underlayer, a recording film was formed of a reproducing layer of 30 nm, an intermediate layer of 10 nm and a recording layer of 80 nm in this order. The recording film was formed by opposing a target and the substrate in the stationary state, placing an adjusting plate with a slit between the target and the substrate to provide directivity to scattering of particles for forming the recording film and setting a gas pressure of 0.1 Pa and an applied electric power of 0.5 kW. The formed reproducing layer contained, as a main ingredient, GdFe having a curie temperature of about 210° C., the intermediate layer contained, as a main ingredient, TbFe having a curie temperature of about 130° C., and the recording layer contained, as a main ingredient, TbFeCo having a curie temperature of about 300° C.

Subsequently, a protecting layer is formed of silicon nitride to a thickness of 60 nm at least on the recording film. The protecting layer was formed by opposing a target and the substrate in the stationary state, placing an adjusting plate with a slit between the target and the substrate to provide directivity to scattering of particles for forming the protecting layer and setting a gas pressure of 0.6 Pa and an applied electric power of 0.8 kW.

The formation of the above-mentioned underlayer, the recording film and the protecting layer was conducted in the same vacuum apparatus.

Thereafter, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The obtained information recording medium was evaluated using a tester with an optical system of 640 nm wavelength and 0.55 NA. The following were evaluation conditions: Data was recorded by the magnetic field modulation system at a circumferential velocity of 1 m/sec, a DC recording power of −3.5 mW, an AC magnetic field of ±2500 e and a length of a recording mark of 0.2 μm. The data was reproduced at a circumferential velocity of 1.5 m/sec and a reproducing power of 2.9 mW while the jitter was measured. The above-mentioned evaluation was carried out on the recording film at the bottom of the grooves. The results are shown in Table 2.

Comparative Example 4

The same substrate as prepared in Example 4 was prepared. An underlayer of silicon nitride, a recording film constituted of a reproducing layer, an intermediate layer and a recording layer, and a protecting layer of silicon nitride were formed on the substrate in this order. The formation of these layers was conducted by opposing a target and the substrate in the stationary state, placing an adjusting plate with a slit between the target and the substrate to provide directivity to scattering of particles for forming these layers. The thicknesses of the layers were the same as those in Example 1. The underlayer had a wall angle of about 70°. After the underlayer was formed, the sharpness of the corners of the underlayer was 6 nm. After the layers were formed, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The obtained information recording medium was evaluated by measuring the jitter under the same conditions as mentioned in Example 4. The results are shown in Table 2.

TABLE 2

|  | Jitter |
|---|---|
| Example 4 | 10.1 nsec |
| Comparative Example 4 | 11.0 nsec |

Table 2 shows that the recording medium of Example 4 can reduce the jitter because the corners are shaper as compared with Comparative Example 4 and as a result the grooves have smaller curves at the corners.

EXAMPLE 5

A disk-form glass substrate was prepared which had grooves whose pitch was 1.2 μm, depth was 60 nm and wall angle was about 60°. In this substrate, the top faces of the lands and the bottom faces of the grooves had the same width. The grooves of the glass substrate were formed in the same manner as described in Example 1.

An underlayer was formed of silicon nitride to a thickness of 70 nm on the substrate by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm. The wall angle of the underlayer was about 85°.

A recording film was formed to a thickness of 25 nm on the underlayer. The recording film was formed by a DC magnetron sputtering method with rotating and revolving (turning) the substrate (a method of low directivity). Film forming conditions were a total gas pressure of argon and nitrogen of 0.5 Pa, an applied electric power of 0.5 kW and a revolution rate of 40 rpm. The resulting recording film contained, as a main ingredient, TbFeCo having a curie temperature of about 200° C.

Subsequently, a protecting layer is formed of silicon nitride to a thickness of 15 nm at least on the recording film. The protecting layer was formed by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm.

Further, a heat-radiating layer is formed of aluminum as a main ingredient to a thickness of 100 nm on the protecting layer. The heat-radiating layer was formed by opposing a target and the substrate in the stationary state, placing an adjusting plate with a slit between the target and the substrate to provide directivity to scattering of particles and setting the gas pressure and the applied electric power to 0.1 Pa and 0.5 kW, respectively.

The formation of the above-mentioned underlayer, the recording film, the protecting layer and the head-radiating layer was conducted in the same vacuum apparatus.

Thereafter, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The obtained information recording medium was evaluated using a tester with an optical system of 640 nm wavelength and 0.55 NA. The following were evaluation conditions: Data was recorded at a circumferential velocity of 9 m/sec, a pulse duty of 50%, a DC recording power of 8 mW, a DC magnetic field of +300 e (here, "+" was due to a "−" erasing direction) and a length of a recording mark of 0.64 μm. The data was reproduced at a circumferential velocity of 9 m/sec and a reproducing power of 1.5 mW while the CNR was measured. The above-mentioned evaluation was carried out by recording the data on the recording film at the bottom of a groove as a main recording track and also on the recording films on both lands adjacent to the groove and measuring the CNR on the recording film of the groove. The results are shown in Table 3.

Comparative Example 5

The same substrate as prepared in Example 5 was prepared. An underlayer of silicon nitride, a reproducing layer, a recording film, a protecting layer of silicon nitride and a heat-radiating layer were formed on the substrate in this order. These layers were formed by a DC magnetron sputtering method with rotating and revolving (turning) the substrate (a method of low directivity). The thicknesses of the layers were the same as those in Example 5. The underlayer had a wall angle of about 85°. After the layers were formed, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The obtained information recording medium was evaluated by measuring the CNR under the same conditions as mentioned in Example 5. The results are shown in Table 3.

TABLE 3

|  | CNR |
| --- | --- |
| Example 5 | 49 dB |
| Comparative Example 5 | 46 dB |

Table 3 shows that the cross-write is reduced and, as a result, the information recording medium of Example 5 can retain the CNR without decreasing it, because the heat-radiating layer is formed on the recording film on the top of the lands and at the bottom of the grooves with intervention of the protecting layer.

EXAMPLE 6

A disk-form glass substrate was prepared which had grooves whose pitch was 1.2 μm, depth was 160 nm and wall angle was about 80°. In this substrate, the top faces of the lands and the bottom faces of the grooves had a width ratio of 1:2. The grooves were formed in the same manner as described in Example 1.

An underlayer was formed of silicon nitride to a thickness of 90 nm on the substrate by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm. The wall angle of the underlayer was about 95°.

On the underlayer, a recording film was formed of a reproducing layer of 30 nm, an intermediate layer of 10 nm and a recording layer of 80 nm in this order. The recording film was formed by opposing a target and the substrate in the stationary state, placing an adjusting plate with a slit between the target and the substrate to provide directivity to scattering of particles for forming the recording film and setting a gas pressure of 0.1 Pa and an applied electric power of 0.5 kW. The formed reproducing layer contained, as a main ingredient, GdFe having a curie temperature of about 210° C., the intermediate layer contained, as a main ingredient, TbFe having a curie temperature of about 130° C., and the recording layer contained, as a main ingredient, TbFeCo having a curie temperature of about 300° C.

Subsequently, a protecting layer is formed of silicon nitride to a thickness of 60 nm at least on the recording film under the same conditions as the underlayer was formed.

The formation of the above-mentioned underlayer, the recording film and the protecting layer was conducted in the same vacuum apparatus.

Thereafter, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The lands and the grooves of the obtained information recording medium were evaluated separately using a tester with an optical system of 640 nm wavelength and 0.55 NA. The evaluation conditions were the same as in Example 1 except that the data was reproduced at an optimal reproducing power such that the jitters of the lands and the grooves became as small as possible. The results are shown in Table 4.

TABLE 4

| | Jitter |
|---|---|
| Land | 10.5 nsec |
| Groove | 10.3 nsec |

Table 4 shows that the recording films on the top of the lands and at the bottom of the grooves can record data with similar quality even if the top of the lands and the bottom of the grooves do not have a width ratio of 1 and the top of the lands has a smaller width. Therefore, it is possible to product recording media stably.

EXAMPLE 7

A disk-form glass substrate was prepared which had grooves whose pitch was 0.85 μm, depth was 40 nm and wall angle was about 70°. In this substrate, the top faces of the lands and the bottom faces of the grooves had a width ratio of 3:7. The grooves were formed in the same manner as described in Example 1.

An underlayer was formed of silicon nitride to a thickness of 90 nm on the substrate by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm. The wall angle of the underlayer was about 90°.

On the underlayer, a recording film was formed of a reproducing layer of 30 nm, an intermediate layer of 10 nm and a recording layer of 80 nm in this order. The recording film was formed by opposing a target and the substrate in the stationary state, placing an adjusting plate with a slit between the target and the substrate to provide directivity to scattering of particles for forming the recording film and setting a gas pressure of 0.1 Pa and an applied electric power of 0.5 kW. The formed reproducing layer contained, as a main ingredient, GdFe having a curie temperature of about 210° C., the intermediate layer contained, as a main ingredient, TbFe having a curie temperature of about 130° C., and the recording layer contained, as a main ingredient, TbFeCo having a curie temperature of about 300° C.

Subsequently, a protecting layer is formed of silicon nitride to a thickness of 60 nm at least on the recording film. The protecting layer was formed by opposing a target and the substrate in the stationary state, placing an adjusting plate with a slit between the target and the substrate to provide directivity to scattering of particles for forming the protecting layer and setting a gas pressure of 0.6 Pa and an applied electric power of 0.8 kW.

The formation of the above-mentioned underlayer, the recording film and the protecting layer was conducted in the same vacuum apparatus.

Thereafter, the substrate was taken out of the vacuum apparatus and was over-coated with an ultraviolet curing resin (SD-1700 produced by Dainippon Ink & Chemicals, Inc.) to form an overcoating film having a thickness of 10 nm. Thus an information recording medium was obtained.

The obtained information recording medium was evaluated using a tester with an optical system of 640 nm wavelength and 0.55 NA. The evaluation conditions were the same as described in Example 1 except that the length of the recording mark was varied. The jitter was measured. The results are shown in Table 5.

TABLE 5

| | Jitter |
|---|---|
| 0.2 μm | 9.6 nsec |
| 0.15 μm | 9.8 nsec |
| 0.1 μm | 10 nsec |

Table 5 shows that, the present invention is also useful for recording data only on the recording film at the bottom of the grooves, a so-called wide-groove recording.

EXAMPLE 8

A disk-form glass substrate was prepared which had grooves whose pitch was 0.85 μm, depth was 160 nm and wall angle was about 70°. In this substrate, the top faces of the lands and the bottom faces of the grooves had a width ratio of 2:8. The grooves were formed in the same manner as described in Example 1.

An underlayer was formed of silicon nitride to a thickness of 90 nm on the substrate by a DC magnetron sputtering method with rotating and revolving (turning) the substrate (a method of low directivity). Film forming conditions were a total gas pressure of argon and nitrogen of 0.6 Pa, an applied electric power of 0.8 kW and a revolution rate of 40 rpm. The wall angle of the underlayer was about 90°.

On the underlayer, a recording film was formed of a recording layer of 80 nm, an intermediate layer of 10 nm and a reproducing layer of 80 nm in this order. The recording film was formed by opposing a target and the substrate in the stationary state, placing an adjusting plate with a slit between the target and the substrate to provide directivity to scattering of particles for forming the recording film and setting a gas pressure of 0.1 Pa and an applied electric power of 0.5 kW. The formed reproducing layer contained, as a main ingredient, GdFe having a curie temperature of about 210° C., the intermediate layer contained, as a main ingredient, TbFe having a curie temperature of about 130° C., and the recording layer contained, as a main ingredient, TbFeCo having a curie temperature of about 300° C.

Subsequently, a protecting layer is formed of silicon nitride to a thickness of 60 nm at least on the recording film. The protecting layer was formed by opposing a target and the substrate in the stationary state, placing an adjusting plate with a slit between the target and the substrate to provide directivity to scattering of particles for forming the protecting layer and setting a gas pressure of 0.6 Pa and an applied electric power of 0.8 kW.

The formation of the above-mentioned underlayer, the recording film and the protecting layer was conducted in the same vacuum apparatus.

Thereafter, the substrate was taken out of the vacuum apparatus and a silicon lubricant film was formed in a thickness of 10 nm. Thus an information recording medium was obtained.

The recording film at the bottom of the grooves of the obtained information recording medium was evaluated from a silicon lubricant film side using a tester with an optical system of 640 nm wavelength and 0.55 NA via a glass plate of 1.2 mm thickness. The evaluation conditions were the same as described in Example 1. As a result, the recording and reproduction was performed similarly to Example 1. That confirms that the information recording medium of Example 8 is useful for the case where the recording and reproduction is conducted from the silicon lubricant film, i.e., the recording and reproduction of the front illumination system.

As described above, according to the present invention, the wall angle of the underlayer can be increased by forming the underlayer on the substrate having such a wall angle that the substrate can be easily produced. Therefore, it is possible to improve the characteristics such as CNR and jitter of the recording film formed on the underlayer.

What is claimed is:

1. A process for producing an information recording medium comprising the steps of:

forming, on a substrate provided with a groove having a wall which forms an angle smaller than 80° with respect to a bottom of the groove, an underlayer having a wall which forms an angle of 80° or more with respect to the bottom of the groove, and a sharpness of 5 nm or less at a corner, by a film forming method of a low directivity; and forming at least a recording film on the formed underlayer at the bottom of the groove, on the top of a projected portion between grooves or both at the bottom of the groove and on the top of the projected portion.

2. A process for producing an information recording medium as set forth in claim 1, wherein the film forming method of the low directivity is a magnetron sputtering method conducted with turning the substrate.

3. A process for producing an information recording medium as set forth in claim 1, wherein the recording film is formed by a helicon sputtering method or an ion beam sputtering method which is conducted with keeping the substrate in a stationary state as a film forming method of a high directivity.

4. An information recording medium comprising:

a substrate with a groove formed thereon;

an underlayer formed on the substrate to cover at least a wall of the groove, the underlayer having a sharpness of 5 nm or less at a corner; and a recording film formed at least at a bottom of the groove, on the top of a projected portion between grooves or both at the bottom of the groove and on the top of the projected portion, wherein the wall of the groove has an angle smaller than 80° with respect to the bottom of the groove and the wall of the underlayer has an angle of 80° or more with respect to the bottom of the groove.

5. An information recording medium as set forth in claim 4, wherein the wall of the groove has an angle of 30° to 70° with respect to the bottom of the groove and the wall of the underlayer has an angle of 80° to 100° with respect to the bottom of the groove.

6. An information recording medium as set forth in claim 4, wherein a protecting layer is formed at least on the recording film.

7. An information recording medium as set forth in claim 4, wherein a heat-radiating layer is further formed on the recording layer at the bottom of the groove, on the top of the projected portion between grooves or both at the bottom of the groove and on the top of the projected portion, with intervention of the protecting layer.

8. An information recording medium as set forth in claim 4, which is used for the land/groove recording method and whose recording film is formed at the bottom of grooves and on the top of projected portions between the grooves.

9. An information recording medium as set forth in claim 4, which is used for the groove recording method and whose recording film is formed at the bottom of grooves.

10. An information recording medium as set forth in claim 4, which is used for recording and reproducing data by irradiating the medium with light from a recording film side opposite to the interface with a substrate.

11. An information recording medium as set forth in claim 4, which is provided with a substrate having grooves formed thereon, an underlayer having been formed on the substrate with turning the substrate and a recording film having been formed on the underlayer with keeping the substrate in the stationary state.

12. An information recording medium as set forth in claim 4, wherein the recording film is comprised of a recording layer, an intermediate layer and a reproducing layer.

* * * * *